June 30, 1970  J. E. BUNNER  3,518,466
DYNAMOELECTRIC MACHINE
Filed Aug. 22, 1968  3 Sheets-Sheet 1

INVENTOR
JAMES E. BUNNER
BY *Edward W. Goebel*
HIS ATTORNEY

June 30, 1970 J. E. BUNNER 3,518,466

DYNAMOELECTRIC MACHINE

Filed Aug. 22, 1968

INVENTOR
JAMES E. BUNNER

BY Edward N. Goebel

HIS ATTORNEY

United States Patent Office 3,518,466
Patented June 30, 1970

---

3,518,466
DYNAMOELECTRIC MACHINE
James E. Bunner, Erie, Pa., assignor to General Electric Company, a corporation of New York
Filed Aug. 22, 1968, Ser. No. 754,569
Int. Cl. H02k 9/19
U.S. Cl. 310—54          22 Claims

ABSTRACT OF THE DISCLOSURE

A liquid cooling system for dynamolectric machines whereby cooling liquid is delivered to the machine for circulation to heated areas without external ductwork connected to the machine. In machines having eddy current conductors of the spinning disc type, the cooling liquid is distributed over the faces of the spinning disc as a substantially uniform, centrifugally moving film. A built-up box-like base supports and partially houses the machine, with provision for directing free jets of cooling liquid to the stator without mechanical connection thereto.

BACKGROUND OF THE INVENTION

This invention relates to dynamoelectric machines of the eddy current inductor type and especially to a liquid cooling system for such machines. The invention is illustrated and described hereinafter with particular reference to eddy current dynamometers, although many of its features are applicable to other eddy current inductor type machines.

The basic components of the well known inductor type eddy current dynamometer comprise relatively rotatable members, i.e., a stator and a rotor, and an excitation coil which can be mounted on either member. The rotor is mounted in suitable bearings such as the oil lubricated, hydrostatic sleeve type and rotated by an external device such as an engine, the output torque of which is to be measured. The stator is cradled in suitable bearings as well but is constrained against rotation by torque measuring means.

A known problem with such machines is to remove the heat which accumulates due to the absorption of energy imparted to the machine by the external engine. Circulating cooling liquid is usually employed for this purpose and is supplied to the dynamometer through a flexible hose or the like. For obvious reasons, there should be no restraint on the cradled stator due to the water connections, and there should be no torque reaction on the stator due to the supply or discharge of cooling water. Special reinforced hose with straight rather than spiral lay is usually used in order to avid a pressure-torque reaction. This special hose is expensive and in scarce supply, and the necessity for its use creates a maintenance problem. Also the hose connections add to the difficulty of removing or replacing the machine in its cradle for maintenance. To minimize this difficulty, hose connections are usually at the top of the machine where they are more easily accessible, but they are then more exposed to damage.

Various arrangements are disclosed in the prior art for channeling the supply of cooling water to those parts of the rotor and/or stator where cooling is important. The design and arrangement of the water passages of course depend in each case on the physical design and configuration of the stator, rotor and other parts of the machine. In general, these arrangements have provided a confined path or paths through the machine from inlet to outlet or drain, through which the cooling water is circulated by pressure supplied from an external source through the hoses referred to above.

SUMMARY OF THE INVENTION

The water distribution system of the present invention is applicable to a disc-type rotor having substantially flat faces in substantially parallel radial planes and rotating between stationary teeth or pole pieces on both sides of the disc but separated from the adjacent disc face by an axial air gap. Cooling water is supplied to each face adjacent its axis of rotation and in such a way that the water spreads out over the entire face in the form of a film moving outward through the air gap to and discharging from the periphery of the spinning disc due to centrifugal force. These films of cooling water not only cover the faces of the disc but also, in passing through the air gaps between these faces and adjacent pole pieces, cool the pole pieces as well.

The cooling water is thrown radially outward from the rim of the spinning disc and is collected by a surrounding cylinder or ring, the external surfaces of which may serve to mount the excitation coils. The water follows the inner surface of this ring to the bottom of the dynamometer where it is suitably guided to a drain or drains at the bottom of the machine.

It has been found that it is necessary to provide a special feed arrangement for applying the cooling water to the central portion of the spinning disc faces in order to obtain uniform films over the whole disc faces. When a single stream or current of water, say from a nozzle, is applied to the central portion of a disc face rotating at relatively high speed, a relatively heavy flow is obtained over a fan-shaped area comprising a relatively small portion of the disc face, but a large part of the face remains dry or at best has thereon no more than a trace of cooling water in the form of a very thin film. It has been found that this difficulty can be avoided by feeding the cooling water to an annular area surrounding and adjacent the axis of rotation of the disc. It is also helpful to maintain the water at least in part in rotation around the axis as it is applied to the disc face. These objectives are accomplished by feeding the cooling water through an annular feed chamber between the drive shaft, or a part rotating with the drive shaft, and a surrounding ring-like stator structure. It may be desirable in some cases to supply cooling water to the feed chamber at a number of circumferentially spaced points.

When water moves in an axial direction through this feed chamber, part of the water tends to cling to the rotating part as it moves axially to the spinning disc, and part of the water is flung outwardly against the surrounding stationary stator part while rotating at some fractional speed of the rotating part. With such an arrangement, the total flow of cooling water moves axially to the disc with a reasonably uniform circumferential distribution about the axis of rotation, and with a certain amount of rotational movement with the disc. Under these conditions the whole face of the disc becomes wetted by the centrifugally spreading water in the form of a uniform film over the entire disc face.

Moreover, in order to eliminate the problems described above which arise out of the use of hoses to supply cooling water to the cradled stator, the water distribution system of the present invention may operate without hoses or any other physical connection to the stator. This may be accomplished by the use of one or more chambers forming part of or mounted on the stator, to which cooling water is supplied in the form of free jets from stationary nozzles directed into the chambers through an inwardly tapering or converging throat or throats. With this arrangement, the velocity of the water in the jet and through the throat is converted into a pressure in the chamber that is somewhat above atmospheric pressure and is sufficient to cause cooling water to flow to the feed chambers chambers and/or the chambers themselves should be shaped or arranged so as to eliminate significant torque reaction on the stator, and to minimize backflow from the throat. The direction of the jet streams can be axial or radial.

BRIEF DESCRIPTION OF THE DRAWINGS

The drawings show an embodiment of the invention in which an eddy current dynamometer has two spining discs which are mounted on the same rotor shaft and spin between separate sets of pole pieces, but it will be understood that this embodiment is for purposes of example and is not to be construed as a definition of the limits of the invention. Obviously, either a single spinning disc can be employed or more than two spinning discs can be employed if desired.

In said drawings.

DESCRIPTION OF PREFERRED EMBODIMENTS

Apart from the novel features of the invention that have already been mentioned in general terms in the preceding summary of the invention, the construction and arrangement of a dynamometer embodying the invention are similar to devices of this type known to the prior art, as will appear from the following description of preferred embodiments.

Figure 1:
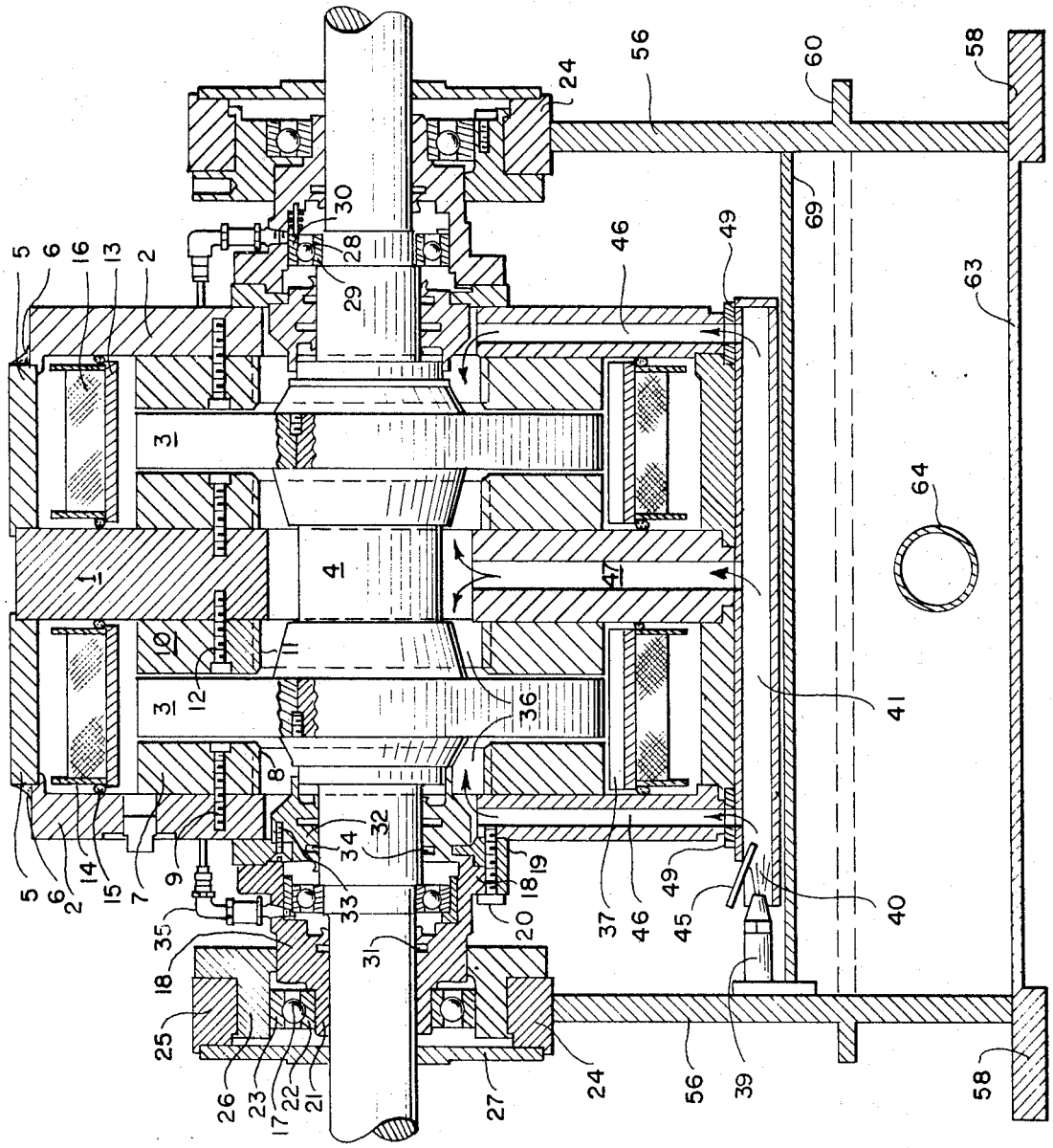
FIG. 1 is a longitudinal sectional elevation of a machine embodying the invention taken on line 1—1 of FIG. 2.
Figure 2:
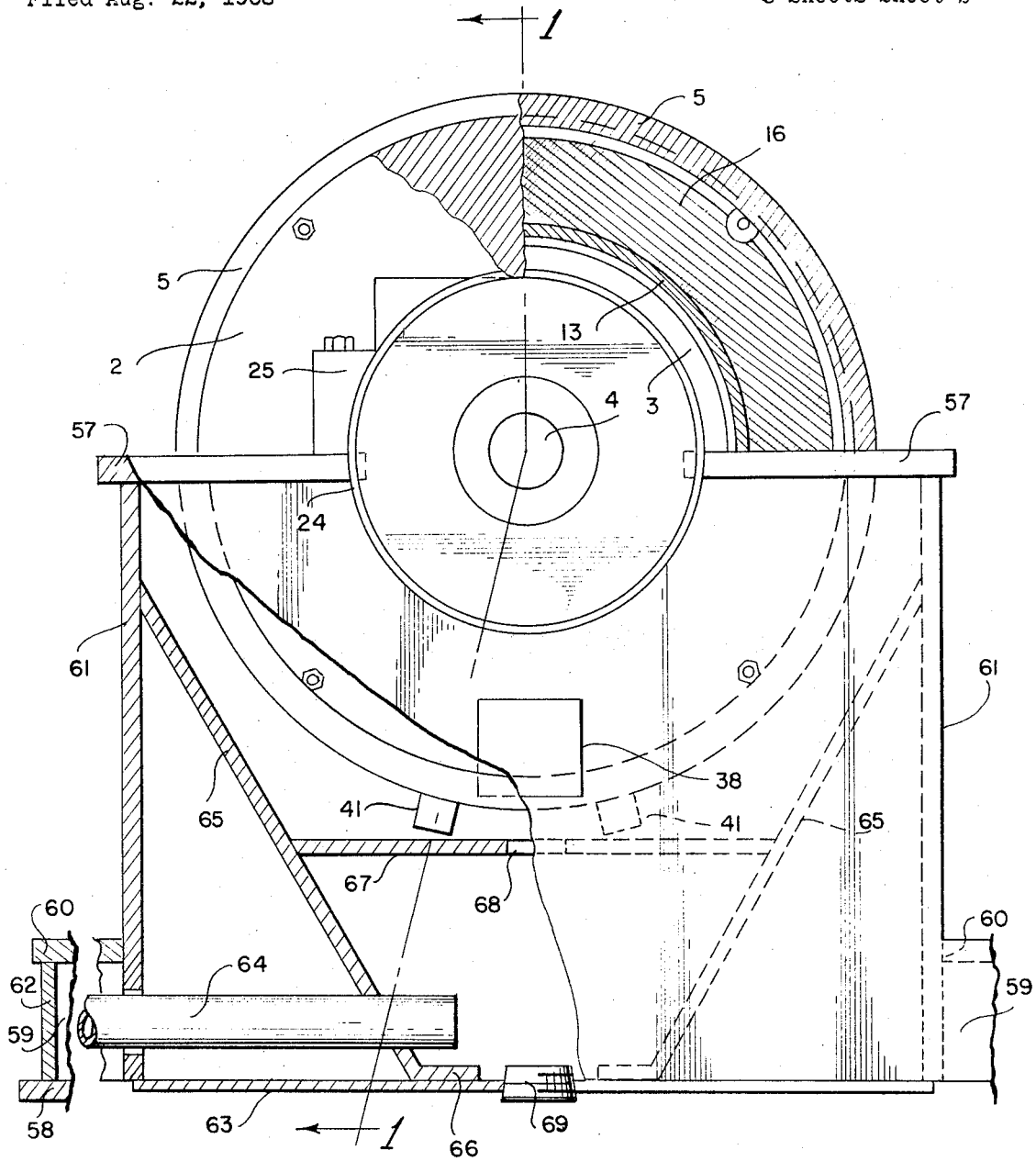
FIG. 2 is an end elevation of the machine, partially in section to show the base construction.

Referring first to FIGS. 1 and 2, the dynamometer stator is built up of parts that are assembled and welded together or otherwise secured together by means such as through bolts. In the form shown, there are three main parts of the stator casing or frame including a centrally located stator ring frame 1 and two end plates 2 forming between them two chambers in each of which there is a spinning disc 3. These discs are carried by and rotate with the shaft 4 which extends from end to end of the machine. One end of the shaft may be connected to and driven by an external machine to be tested, while a second external machine to be tested can be set up at the other end of the shaft, both ends of the shaft being adapted to be driven by tested machines. If desired, a tachometer can also be driven by the shaft, by means of a belt drive or other suitable apparatus.

The two chambers on opposite sides of the stator ring 1 are completed and enclosed circumferentially in any suitable manner as by means of cylinders 5, the inner edges of which fit against and are secured to the peripheral portion of the frame ring 1 in any suitable manner. The outer edges of the cylinders 5 engage the peripheral portions of the end plates 2 and are secured thereto in any suitable manner. Welding is indicated at 6 by way of example.

As will be understood from the above summary, each of the chambers encloses two sets or series of teeth or pole pieces arranged on opposite sides of the spinning disc 3. As shown, the pole pieces 7 of one set extend radially from and are integral with a supporting ring 8, this unitary structure being secured in any suitable manner to the adjacent end plate 2 as by means of screws 9. A similar set of pole pieces or teeth 10 and a supporting ring 11 are mounted on the stator ring frame 1 by means of screws 12. It will be understood that this arrangement is duplicated in the other disc chamber.

Excitation means are provided to establish a magnetic flux which passes through the frame and between the opposed pole pieces 7 and 10, traveling through the air gaps between the spinning discs 3 and pole pieces and creating eddy currents in the spinning disc inductors as will be understood by those skilled in the art. As shown, a supporting ring or cylinder 13 is located in each disc chamber surrounding the spinning disc 3, the supports 13 being held in place by virtue of being clamped between the stator frame 1 and the end plates 2. Flanges 14 project radially outward from the edges of each support 13 and preferably suitable gaskets 15 are located between the flanges 14 and the adjacent end plate 2 and stator frame 1. This construction provides a U-shaped annular channel for an excitation coil 16.

The stator of the machine is rotatably mounted in suitable cradle bearings here shown as ball bearings 17. To this end a trunnion structure 18 is secured to each end plate 2, or to a ring 19 integral therewith, by means such as screws 20. Each trunnion terminates in a nose 21 of reduced diameter which carries the inner race 22 of the ball bearings 17. The outer race 23 of the bearing is supported by the base construction hereinafter described, particularly by means of a half-ring support 24 and a cap 25, an adapter ring 26 being interposed between the support ring 24 and its cap 25 and the outer bearing race 23. The adapter ring makes it possible to adjust the position of the outer bearing race 23 circumferentially to compensate for wear. Preferably the end of the bearing supporting structure is closed by a suitable cover plate 27 secured by screws or the like to support ring 24 and cap 25.

The shaft 4 rotates inside the trunnion 18, 21 and is preferably supported in suitable bearings such as a ball bearing 28, the inner race 29 of which is mounted on the shaft and the outer race 30 of which is mounted inside the trunnion 18. Preferably the space around the bearing 28 is arranged for through circulation of oil for cooling and lubrication purposes. To enclose this space, the outer part of the trunnion structure is provided with a sealing groove or grooves 31 around the shaft 4; also the supporting ring 19, which forms part of the end plate 2, carries a suitable shaft seal 32 secured thereto by means such as screws 33 and provided with one or more sealing grooves 34 around the shaft 4. Oil is supplied to the space between the seals 31 and 34 by means such as oil supply pipe 35 and waste oil can be drained from the space in any desired manner.

It will be understood that in operation, the magnetic flux generated by the coil 16 passes through the frame parts and between the pole pieces 7 and 10, traversing the air gaps between these pole pieces and the disc faces of the spinning discs 3 and also passing through the discs and thus generating eddy currents in these inductors. As a result, the stator is subjected to a torque that tends to cause it to rotate in its cradle bearings 17. This rotation is restrained by suitable measuring means which give an indication of the torque generated by the external engine which drives the shaft 4.

The well known concomitant of such operation is that a large amount of heat is generated in the machine due to the induced eddy currents, and this heat must be absorbed and dissipated by suitable cooling means. Usually a cooling liquid such as water is circulated through such machines in contact with the areas which are apt to overheat. In the present instance, it is important to cool both faces of each spinning disc 3, as well as the adjacent faces of the pole pieces 7 and 10. For this purpose it is desired to provide a centrifugally moving film of cooling water distributed over each face of each spinning disc and moving between the disc and the adjacent pole pieces. However, difficulty has been encountered in maintaining such a film because application of a stream of water to a spinning disc face at one point results only in a film over a more or less fan shaped sector of this face. In the present invention this problem is eliminated by supplying cooling water to the disc face not merely at a point or points but instead over an annular zone of application which fairly closely surrounds the shaft 4 on which the disc is mounted. Preferably also the feed of water to this zone of application is accomplished by an annular feed chamber, the inner wall of which rotates with the shaft and the outer wall of which remains stationary with the stator of the machine. As shown, such feed chambers 36 are formed between the outer stationary rings 8 and 11 which carry the pole pieces 7 and 10 respectively, these rings being secured to and stationary with the stator, and the rotating shaft 4 the circumference of which forms the inner rotating wall of the feed chamber.

Cooling water can be fed to the annular feed chambers 36 in any suitable manner, the cooling water moving axially through each chamber to the adjacent disc face and being applied to an annular zone surrounding the shaft 4. At the same time, the axially moving body of water in each chamber 36 picks up a certain amount of rotational movement because it is in contact with the rotating shaft. Due to these effects, it is found that a uniform film of cooling water moves centrifugally outward over each entire face of the spinning discs 3 and between these faces and the adjacent pole pieces 7 and 10, cooling these elements and being discharged centrifugally from the peripheries of the spinning discs against the surrounding coil supporting rings 13. The centrifugally discharged water tends to travel around the inner surface of each ring 13 down toward the bottom of the machine where it can be discharged laterally by means of suitable deflector plates 37 forming dams on the inner surfaces of the rings. The discharged cooling water is thus caused to move laterally out through suitable openings in the end plates 2 from which it is deflected downwardly to drainage by suitable covers or hoods 38 (FIG. 2) on the end plates.

Figure 3:
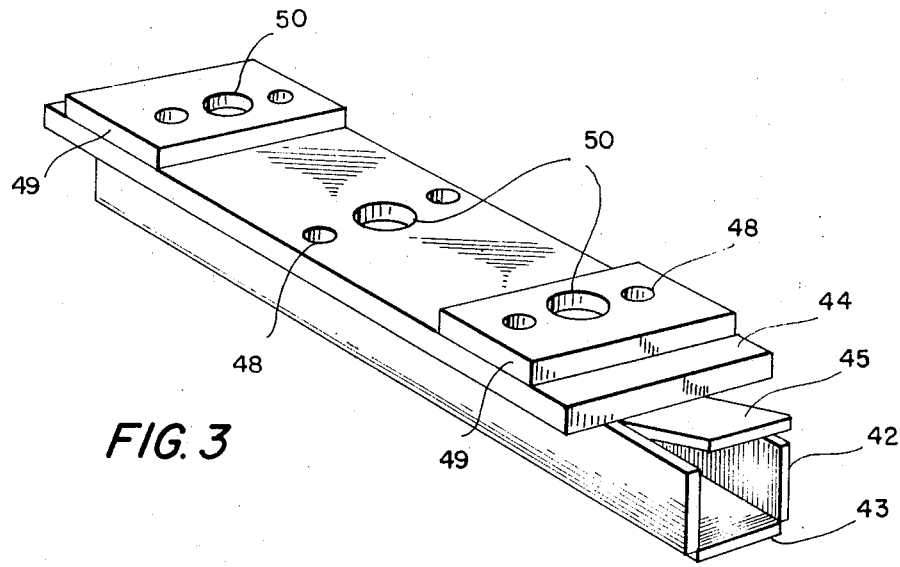
FIG. 3 is a detail view in perspective and showing one suitable form of cooling water chamber to be supplied by an axially directed free jet of water as described above.

As already stated in the summary, it is preferred to supply cooling water to the feed chambers 36 by means which eliminate the use of all external mechanical connections to the stator, i.e., by means of a free jet of water. FIGS. 1, 2 and 3 illustrate one form of device that can be employed to receive an axially-directed jet of cooling water. The jet itself may be produced in any desired way as by a small nozzle or in many cases merely the end of a small pipe. Whatever mechanical device is employed, it can be mounted in any desired manner in the base hereinafter described. As shown in FIG. 1, a suitable nozzle 39 is mounted in one of the walls of the supporting base and produces a free jet at 40 which is directed into an axially extending chamber 41 shown in this case to be of rectangular cross section. The details of the box or chamber 41 are illustrated more clearly in FIG. 3. Side walls 42 and a bottom wall 43 provide a rectangular channel, the top of which is closed by a cover plate 44 of greater width than the chamber 41. One end of this boxlike chamber is closed and the open end shown in FIG. 3 is provided with an inclined plate 45 which provides an inwardly converging or tapering throat into which the jet 40 is delivered. This arrangement tends to minimize back flow of water from the box, although any such back flow which does take place is merely added to the cooling water which has passed through the machine and drains from the hoods 38 as already described. The energy in the jet 40 is converted in part into a pressure in the liquid-filled chamber 41 which is sufficient to cause the liquid to pass through passages 46 in the end plates 2 and through passages 47 in the stator frame ring 1 and thus to reach the feed chambers 36 described above. Preferably two chambers 41 are employed which are located at equal angles on either side of the bottom center line of the machine as indicated in FIG. 2, thereby balancing out any rotational components of force which might arise due to the weight of water collected if a single box were used.

Any desired means can be employed for mounting the boxes or chambers 41 on the stator structure of the machine. As shown in FIG. 3, the circumferences of the two end plates and of the stator ring frame 1 are tangentially flattened by machining or otherwise so as to provide areas for the attachment of the boxes by screws or bolts (not shown) which pass through the bolt holes 48 formed in the marginal flanges of the cover plate 44 as shown in FIG. 3. Spacers 49 are provided on top of the ends of the cover plate 44 because of the somewhat greater diameter of the stator ring frame 1 as compared with the end plates 2. The cover 44 and the spacers 49 (when used) are provided with openings 50 which register with the passages 46 and 47 and communicate with the interior of the box 41.

Figure 5:
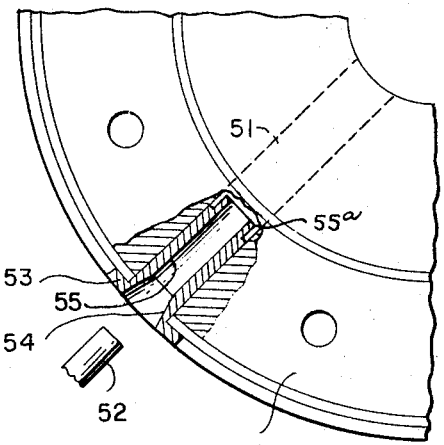
FIG. 5 shows another form of cooling water chamber which is to be supplied by a radially directed free jet of water.

FIG. 5 shows another arrangement for delivering cooling water from a free jet to the annular feed chambers described above, in which the direction is radial rather than axial. FIG. 5 shows by way of example a portion of the stator ring 1 having a radial passage 51 bored therein from the outer circumference to the inner circumference and more or less equivalent to the passage 47 of FIG. 1. Cooling water is directed into this radial passage 51 by suitable nozzle means such as a small pipe 52. The outer end of the passage 51 receives an adapter 53, the outer end of this adapter having a more or less conically tapered wall 54 forming an inwardly converging or tapering throat as already described. Beyond the inner end of throat 54, the wall 55 of the passage through the fitting 53 may be approximately cylindrical but preferably of smaller diameter than the passage 51. If desired this portion of the fitting may also be tapered slightly according to any of the known drill tapers such as American Standard, Morse, etc.

Back flow of cooling liquid through the fitting 53 toward the pipe 52 is inhibited by means of a cylindrical extension 55a on an inner wall 55 of the fitting 53. The cylindrical extension 55a forms a chamber with an adjacent portion of the wall of the passage 51 such that it was found that there was substantially no back flow of the cooling liquid through the fitting 53. It is theorized that any back flow which might occur in the passage 51 meets the obstruction formed by the chamber and is essentially turned around to flow in the direction of the jet, in a radially inward direction.

The operation of a cooling system according to FIG. 5 takes place in essentially the same way as in FIG. 1 and FIG. 2, except that in FIG. 5, more pipe nozzles and jets are required. The machine thus far described is mounted in a base which supports the cradle bearings already mentioned and is specially arranged and constructed to have maximum stiffness and minimum vibration throughout the operating range of the machine. It is also preferred to build up this improved base from plate elements welded together in order to avoid the use of heavier and more expensive castings and machining operations, as well as to enable partition walls to be so placed as to provide maximum stiffness and rigidity. Features of the described structure pertaining to the improved base construction are more fully described and are claimed in a patent application filed concurrently herewith in the name of R. J. Hanson, Ser. No. 754,564, Cl. 310/091 and assigned to the assignee of the present invention.

Figure 4:
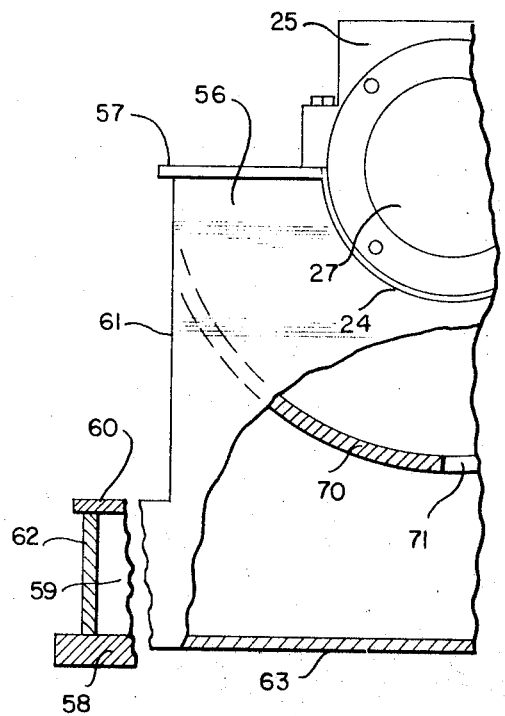
FIG. 4 is another partial end elevation, partially in section, which shows a different form of base.

In the form shown, referring to FIGS. 1 and 4, the base comprises two spaced and substantially parallel end walls 56 which extend up to the level of the center line of the machine, each of these end walls having welded to its upper edge one of the previously mentioned half-ring supports 24 for the cradle bearings 17. The upper edge of the end walls 56 have horizontal top plates 57 extending outwardly from the half-ring bearing support 24 to the sides of the base and also cooperating with the bearing cap 25 which retains the adapter ring 26 and cradle bearing 17 in place.

As seen in FIG. 1, the end walls 56 are preferably of relatively heavy stock so as to carry the weight of the machine and they extend down to the bottom of the base where they are supported on foot pads 58. Preferably the end walls 56 are also provided with extensions 59 (FIGS. 2 and 4) on one or both sides of the machine to support shelf-like extensions 60 on which auxiliary equipment can be maintained such as scales and the like.

At the sides of the base, the end plates 56 are connected by spaced vertical side plates 61 which extend between the end plates 56 above the level of the foot pads 58. Also at the edges of the shelf-like projections 60, lower side plates 62 extend between the extensions 59 and foot pads 58. The bottom of the base is completed by a bottom plate 63 which extends between the end plates 56 and between the side plates 61 so as to close up the base. Since drainage water collects in the base as described above, suitable draining means are provided such as a drain pipe 64 (FIG. 1).

It will be understood that a dynamometer supported in the cradle bearings 17 is approximately half enclosed within the open-topped box-like base formed of the side and end walls and the bottom wall described above. In order to strengthen and stiffen this framework against vibration at high speeds of rotation, additional partition walls are provided which preferably form a substantially trough-like structure extending underneath the bottom part of the machine. This trough structure extends from end wall to end wall of the machine and is suitably secured to the end walls, as by welding, so as to provide a much greater degree of longitudinal stiffening than would be provided simply by the end walls 56 and side walls 61, and also substantially greater than can be secured with the prior known construction in which a heavy base casting is machined to receive pedestals bolted to the base one at each end of the machine. Also the trough structure preferably extends from side wall 61 to side wall 61 so as to provide additional stiffening transverse to the axis of the machine. This arrangement also in effect funnels drainage water down to a suitable opening through which the water falls into the box-like base and is then drained by the pipe 64.

Referring to FIG. 2, the trough structure comprises inclined side walls 65, the upper edges of which are secured (e.g., by welding) to the side walls 61 and the end edges of which are likewise secured to the end plates 56 in a similar manner. These inclined partition walls 65 thus comprise longitudinal stiffening members, and by extending them down to the base plate 63 as indicated at 66, they provide vertical stiffening as well. The trough structure is completed by a horizontal partition 67 which extends between and has its end edges welded to the end walls 56, and which extends between the inclined partition walls 65 just below the stator structure with its side edges welded to these partition walls 65 so as to provide transverse stiffening. For drainage water, either that from hoods 38 at the end of the machine or back flow from pressure box 41, the horizontal partition 67 is provided with a central opening 68 whereby drainage water collects in the bottom of the base from which it is drained out from pipe 64 already mentioned. As an alternative, a drain plug 69 can be provided in the exterme bottom of the base.

In FIG. 4, the trough structure of FIG. 2 is replaced by a single curved wall 70 which extends between and is welded at its ends to the end walls 56, and which has its side edges welded to the side plates 61. The cross sectional curve of the wall 69 is such as to carry it below the stator structure projecting downwardly into the casing, and the wall 70 is provided with a drain opening 71 whereby drainage water can escape to the bottom of the base as described above.

It will be understood by those skilled in the art that the several novel features of the invention described above can be embodied in mechanical constructions other than those illustrated and described by way of example.

What I claim as new and desire to secure by Letters Patent of the United States is:

1. In a dynamoelectric machine of the type having a stator and a rotor in the form of at least one disc with flat faces in radial planes, said disc spinning between axially spaced pole pieces mounted on said stator with an air gap separating each face of said disc and adjacent pole pieces, the improvements which comprise means providing annular cooling liquid feed chambers surrounding the axis of rotation of said disc one on each side thereof, each chamber opening annularly to the adjacent disc face, means on said stator forming a liquid pressure chamber having an opening to receive a free jet of cooling liquid and converting the velocity of the jet into liquid pressure in said chamber, said stator having liquid passages connecting said pressure chamber with said feed chambers, the cooling liquid passing from said pressure chamber through said passages and said feed chambers to said disc faces and spreading outwardly in film form by centrifugal force through the air gaps between said faces and adjacent pole pieces to the periphery of the disc, and means for collecting cooling liquid discharged centrifugally from said periphery and conducting it to drainage from said stator.

2. In a dynamoelectric machine of the type having a stator and a rotor in the form of at least one disc having substantially smooth surfaces of revolution on each side thereof, said disc spinning between axially spaced pole pieces mounted on said stator with an air gap separating each surface of said disc and adjacent pole pieces, the improvements which comprise means providing an annular cooling liquid feed chamber in frusto-conical configuration surrounding the axis of rotation of said disc on at least one side thereof, each chamber opening annularly to an adjacent disc surface, said stator having liquid supply passages for conducting cooling liquid from an external supply to said chamber, the cooling liquid passing from said chamber to said disc surfaces and spreading outwardly in film form by centrifugal force through the air gaps between said surfaces and adjacent pole pieces to the periphery of said disc to cool said disc.

3. Improvements as defined in claim 2, the inner frusto-conical concentric wall of said feed chamber rotating with said rotor and the outer concentric wall of said chamber being stationary with said stator.

4. Improvements as defined in claim 2, including means for collecting cooling liquid discharged centrifugally from said periphery comprising a ring forming part of the stator and extending around the periphery of said spinning disc, and means at the bottom of said ring for deflecting liquid following the inner circumference of said ring in an axial direction to a drainage outlet from said stator.

5. Improvements as defined in claim 4, including sealing means between the edges of said ring and adjacent stator structure, and excitation coil means mounted on the outer surface of said ring.

6. In a dynamoelectric machine of the type having a stator and a rotor in the form of at least one disc with flat faces in radial planes, said disc spinning between axially spaced pole pieces mounted on said stator with an air gap separating each face of said disc and adjacent pole pieces, the improvements which comprise means providing annular frusto-conical cooling liquid feed chambers surrounding the axis of rotation of said disc with one on each side thereof, each chamber opening annularly to an adjacent disc face, said stator having liquid supply passages for conducting cooling liquid from an external supply to said feed chambers, the cooling liquid passing from said feed chambers to said disc faces and spreading outwardly in film form by centrifugal force through the air gaps between said faces and adjacent pole pieces on the periphery of said disc to cool said disc, and means for collecting the cooling liquid discharged centrifugally from said periphery and conducting it to drainage from said stator.

7. In a dynamoelectric machine of the type having a stator and rotor and liquid circulation passages for conducting cooling liquid from an external supply to the areas to be cooled and therefrom to drainage from said machine, the improvement which comprises means on said stator forming a liquid pressure chamber having an opening to receive a free jet of cooling liquid from an external supply and converting the velocity of the jet into liquid pressure in said pressure chamber, said pressure chamber communicating with said liquid circulation passages.

8. Improvements as defined in claim 7, said pressure chamber being box-shaped and extending axially with an open end to receive an axially-directed jet, and a deflector plate located in said open end and extending from side to side of the box, said plate being inclined to receive and direct the jet liquid into said pressure chamber through a slot-like opening which is narrower than the open end of the box in the top-to-bottom direction.

9. Improvements as defined in claim 7, said pressure chamber being substantially cylindrical and extending radially with respect to the axis of rotation of said rotor to receive a radially directed jet and having a conically shaped inwardly converging throat to receive said jet.

10. Improvements as defined in claim 9 which further comprise means including the sides of said passage for forming an annular chamber about the inner radial end of said pressure chamber to inhibit the back flow of cooling liquid toward the jet.

11. Improvements as defined in claim 7, said opening being in the form of an inwardly converging throat passage extending into said chamber.

12. Improvements as defined in claim 11, said pressure chamber being box-shaped and extending axially with an open end to receive an axially-directed jet, and a deflector plate located in said open end and extending from side to side of the box, said plate being inclined to receive and direct the jet liquid into said pressure chamber through a slot-like opening which is narrower than the open end of the box in the top-to-bottom direction.

13. Improvements as defined in claim 11, said pressure chamber being substantially cylindrical and extending radially with respect to the axis of rotation of said rotor to receive a radially directed jet and having a conically shaped inwardly converging throat to receive said jet.

14. Improvements as defined in claim 13, which further comprise means including the sides of said passage for forming an annular chamber about the inner radial end of said pressure chamber to inhibit the back flow of cooling liquid toward the jet.

15. In a dynamoeletic machine of the type having a stator and rotor and liquid circulation passages for conducting cooling liquid from an external supply to the areas to be cooled and therefrom to drainage from said machine, the improvement which comprises means on said stator forming a liquid pressure chamber having an opening to receive a free jet of cooling liquid from an external supply and converting the velocity of the jet into liquid pressure in said pressure chamber, said pressure chamber communicating with said liquid circulation passages, the walls of said pressure chamber at the sides of the incoming jet being arranged symmetrically about the jet so that tangential forces on the stator due to impingement of the jet on said walls are substantially equal and opposite.

16. Improvements as defined in claim 15, said pressure chamber being box-shaped and extending axially with an open end to receive an axially-directed jet, and a deflector plate located in said open end and extending from side to side of the box, said plate being inclined to receive and direct the jet liquid into said pressure chamber through a slot-like opening which is narrower than the open end of the box in the top-to-bottom direction.

17. Improvements as defined in claim 15, said pressure chamber being substantially cylindrical and extending radially with respect to the axis of rotation of said rotor to receive a radially directed jet and having a conically shaped inwardly converging throat to receive said jet.

18. Improvements as defined in claim 17 which further comprise means including the sides of said passage for forming an annular chamber about the inner radial end of said pressure chamber to inhibit the back flow of cooling liquid toward the jet.

19. Improvements as defined in claim 17, the walls of said pressure chamber being arranged symmetrically around the center line of the jet to form an inwardly tapering throat receiving said jet and directing it into said pressure chamber.

20. Improvements as defined in claim 19, said pressure chamber being box-shaped and extending axially with an open end to receive an axially-directed jet, and a deflector plate located in said open end and extending from side to side of the box, said plate being inclined to receive and direct the jet liquid into said pressure chamber through a slot-like opening which is narrower than the open end of the box in the top-to-bottom direction.

21. Improvements as defined in claim 19, said pressure chamber being substantially cylindrical and extending radially with respect to the axis of rotation of said rotor to receive a radially directed jet and having a conically shaped inwardly converging throat to receive said jet.

22. Improvements as defined in claim 21 which further comprise means including the sides of said passage for forming an annular chamber about the inner radial end of said pressure chamber to inhibit the back flow of cooling liquid toward the jet.

References Cited

UNITED STATES PATENTS

| | | | |
|---|---|---|---|
| 2,189,189 | 2/1940 | Bennett | 73—134 XR |
| 3,050,647 | 8/1962 | Winther | 310—54 XR |
| 3,296,475 | 1/1967 | Parker | 310—268 |
| 2,527,878 | 10/1951 | Fechheimer | 310—54 |
| 3,223,043 | 12/1965 | Shapiro | 310—268 XR |
| 3,135,111 | 6/1964 | Roe | 73—134 |
| 752,168 | 2/1904 | Holzwarth | 310—58 |
| 2,645,730 | 7/1953 | Bessierè | 310—54 XR |
| 2,701,315 | 2/1955 | Winther | 310—54 XR |
| 3,217,193 | 11/1965 | Rayner | 310—54 |
| 2,453,509 | 11/1948 | Hugin | 310—105 XR |
| 2,487,551 | 11/1949 | Hugin | 310—93 |
| 2,428,634 | 10/1947 | Nordstrum | 310—93 |

MILTON O. HIRSHFIELD, Primary Examiner

B. A. REYNOLDS, Assistant Examiner

U.S. Cl. X.R.

73—134; 310—58, 93, 268